(12) United States Patent
Thomas

(10) Patent No.: US 10,173,600 B1
(45) Date of Patent: Jan. 8, 2019

(54) STORAGE BIN ARRANGEMENT FOR A MOTOR VEHICLE

(71) Applicant: FAURECIA INTERIOR SYSTEMS, INC., Auburn Hills, MI (US)

(72) Inventor: Louis Thomas, Detroit, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 15/639,631

(22) Filed: Jun. 30, 2017

(51) Int. Cl.
*B60R 7/06* (2006.01)

(52) U.S. Cl.
CPC ...................... *B60R 7/06* (2013.01)

(58) Field of Classification Search
CPC ........................................ B60R 7/06
USPC ...................................... 296/37.12
See application file for complete search history.

(56) References Cited

U.S. PATENT DOCUMENTS

| 4,930,737 A | * | 6/1990 | McNeill | B60R 7/06 224/542 |
| 7,226,103 B2 | * | 6/2007 | Chang | B60R 7/06 296/37.12 |
| 2009/0302628 A1 | * | 12/2009 | Cinco | B60N 3/083 296/37.1 |

FOREIGN PATENT DOCUMENTS

CN 103158628 A 6/2013

* cited by examiner

*Primary Examiner* — Joseph D. Pape
(74) *Attorney, Agent, or Firm* — LKGlobal | Lorenz & Kopf, LLP

(57) ABSTRACT

Storage bin arrangements for motor vehicles are provided. In one example, a storage bin arrangement for a motor vehicle includes a surround having a surround wall that defines a stowage space. A bin has a bin wall that defines a bin storage compartment. The bin moves in the stowage space between a closed position and an open position. In the closed position, the bin storage compartment is substantially disposed in the stowage space. In the open position, the bin storage compartment is substantially exposed. A flap arrangement includes a flap section extending between the bin and the surround wall. The flap arrangement moves the flap section relative to the bin during movement of the bin between the closed position and the open position.

14 Claims, 11 Drawing Sheets

STORAGE BIN ARRANGEMENT FOR A MOTOR VEHICLE

TECHNICAL FIELD

The technical field relates generally to storage bin arrangements for motor vehicles, and more particularly to storage bin arrangements, such as glove box door-bin assemblies, cup holder assemblies or other storage bin assemblies, with a movable flap arrangement.

BACKGROUND

Providing adequate and practical storage space for drivers and other occupants of motor vehicles has traditionally been a priority for automobile manufacturers. In the vehicle interior, various storage bin compartments are often provided with, for example, a door panel that extends across the storage bin compartment in a closed position to cover the storage compartment and that can be opened to expose the storage bin compartment making it accessible to the driver or other vehicle occupants. For example, glove box storage bin compartments typically include a glove box door that can be closed to cover the glove box storage bin compartment and securely store and hide any contents contained therein and that can be opened to allow access to the storage bin compartment.

In one storage bin device described in CN103158628, a glove box assembly includes a storage bin compartment that is secured to a glove box door and that moves with the glove box door when the glove box door is open and closed. The storage bin compartment is formed by several generally vertical bin walls including a vehicle rearward bin wall that is attached to the glove box door and a vehicle forward bin wall that is on a side of the storage bin compartment opposite the glove box door. The storage bin compartment is stowed in a space formed in an instrument panel with the vehicle forward bin wall arranged in a mid-interior portion of the instrument panel when the glove box door is closed and the storage bin compartment is concealed behind the glove box door. When the glove box door is open, the glove box door and the storage bin compartment rotate about a lower pivot axis along the instrument panel to expose the storage bin compartment.

Unfortunately, there are some issues with this approach especially in view of current design trends and higher content requirements for instrument panels or the like which are resulting in less available packaging space (e.g., surrounding walls are getting lower for packaging glovebox bins or the like). First, in the open position, a gap between the vehicle forward wall of the storage bin compartment and the mid-interior portion of the instrument panel is visible to the vehicle occupants, thereby exposing the under structure of the instrument panel, which is aesthetically undesirable. Further, the gap can allow various contents contained in the storage bin to fall through the gap where the item(s) can get trapped behind the storage bin between the mid-interior portion of the instrument panel and the vehicle forward bin wall.

Accordingly, it is desirable to provide storage bin arrangements that can overcome one or more of these foregoing issues. Furthermore, other desirable features and characteristics of the present disclosure will become apparent from the subsequent detailed description and the appended claims, taken in conjunction with the accompanying drawings and this background.

BRIEF SUMMARY

Storage bin arrangements for motor vehicles are provided herein. In accordance with an exemplary embodiment, a storage bin arrangement for a motor vehicle includes a surround having a surround wall that at least partially defines a stowage space. A bin has a bin wall that at least partially defines a bin storage compartment. The bin is configured to move in the stowage space between a closed position and an open position. In the closed position, the bin storage compartment is substantially disposed in the stowage space. In the open position, the bin storage compartment is substantially exposed. A flap arrangement includes a flap section extending between the bin and the surround wall. The flap arrangement is configured to move the flap section relative to the bin during movement of the bin between the closed position and the open position.

BRIEF DESCRIPTION OF THE DRAWINGS

The various embodiments will hereinafter be described in conjunction with the following drawing figures, wherein like numerals denote like elements, and wherein.

DETAILED DESCRIPTION

Figure 1:
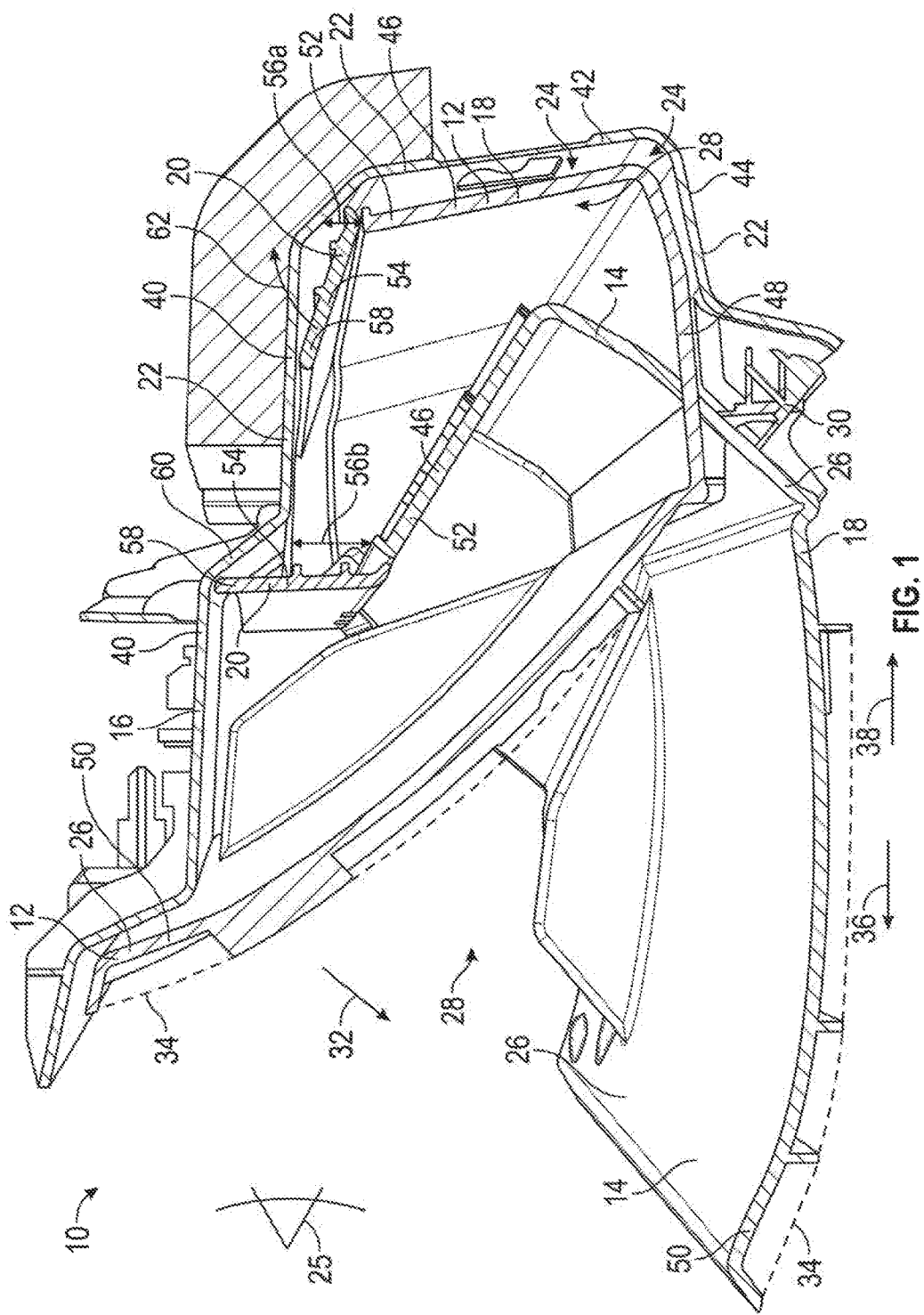
FIG. 1 is a sectional view of a storage bin arrangement in a closed position and an open position in accordance with an exemplary embodiment.

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to storage bin arrangements for motor vehicles. The exemplary embodiments taught herein provide an improved storage bin arrangement for a motor vehicle. In an exemplary embodiment, the storage bin arrangement includes a surround. The surround may be, for example, a substrate for a vehicle interior component or assembly such as a portion of (e.g., substrate or other structure) of an instrument panel or the like. The surround has a surround wall that at least partially defines a stowage space. A bin has a bin wall that at least partially defines a bin storage compartment. The bin is configured to move in the stowage space between a closed position and an open position. In the closed position, the bin storage compartment is substantially disposed in the stowage space. In the open position, the bin storage compartment is substantially exposed, for example, to a vehicle occupant. A flap arrangement includes a flap section extending between the bin and the surround wall. The flap arrangement is configured to move the flap section relative to the bin during movement of the bin between the closed position and the open position.

In an exemplary embodiment, it has been found that by having a flap section extending between the bin and the surround wall and further, with the flap section movable in response to the bin moving between the closed and open positions, any gaps or spaces (e.g., visible gaps) between the bin wall and the surround wall are minimized or eliminated. Advantageously, by minimizing or eliminating any gaps between the bin and surround walls, the surround or other understructure is not exposed to the vehicle occupant(s) when the storage bin compartment is open. Further, any contents in the storage bin compartment are likely blocked or obstructed by the flap section from falling behind the bin and getting trapped between the bin wall and the surround wall or other understructure.

In an additional advantage of the storage bin assembly disclosed herein is that, in some embodiments, the flap arrangement further includes a biasing member having a first portion that is operatively coupled to the flap section. The biasing member biases the flap section towards the surround wall during movement of the bin between the closed position and the open position, for example, to minimize or eliminate any gaps between the bin and surround walls.

An additional advantage of the storage bin assembly disclosed herein is that, in some embodiments, the biasing member is a traction or tension spring having the first portion operably coupled to the flap section. Traction or tension springs are readily available and relatively simple to implement in designed and production, thereby facilitating low cost and/or efficiency in design and manufacture.

In an additional advantage of the storage bin assembly disclosed herein is that, in some embodiments, the biasing member has a second portion coupled to the surround. The bin storage compartment moves relative to the surround and by operatively coupling the second portion of the biasing member to the surround, the biasing member can be efficiently tensioned to bias the flap section towards the surround wall during movement of the bin.

An additional advantage of the storage bin assembly disclosed herein is that, in some embodiments, the biasing member is a torsion spring, leaf spring, or clip spring that has the first portion operatively coupled to the flap section. Torsion, leaf, or clip springs are readily available and relatively simple to implement in designed and production, thereby facilitating low cost and/or efficiency in design and manufacture.

In an additional advantage of the storage bin assembly disclosed herein is that, in some embodiments, the biasing member has a second portion that is coupled to the bin. By coupling the second portion of the biasing member to the bin, the flap arrangement can be installed with the bin for efficient installation into the stowage space of the surround during production assembly.

An additional advantage of the storage bin assembly disclosed herein is that, in some embodiments, the biasing member is an elastomeric member having the first portion operatively coupled to the flap section. Elastomeric members, e.g., rubber members such as elongated rubber members, rods, cords or the like, are readily available and relatively simple to implement in designed and production, thereby facilitating low cost and/or efficiency in design and manufacture.

In an additional advantage of the storage bin assembly disclosed herein is that, in some embodiments, a base section that is fixedly coupled to the bin. The flap section is pivotably coupled to the base section and the biasing member has a second portion that is coupled to the base section. By coupling the second portion of the biasing member to the base section that is fixedly coupled to the bin, the flap arrangement can be installed with the bin for efficient installation into the stowage space of the surround during production assembly.

An additional advantage of the storage bin assembly disclosed herein is that, in some embodiments, the surround wall has a first surround wall portion (e.g., upper surround wall portion) and a second surround wall portion (e.g., lower surround wall portion) that are spaced apart from each other and a third surround wall portion (e.g., intermediate generally vertical surround wall portion) that extends between and is coupled to the first and second surround wall portions. The first and second surround wall portions extend in corresponding directions generally away from the third surround wall portion to define the stowage space. The flap section has a first outer edge portion spaced apart from the bin wall and the biasing member is operatively coupled to the flap section to bias the first outer edge portion of the flap section towards the first surround wall portion. By keeping the first outer edge portion of the flap section bias towards the first surround wall portion, any gap between the bin wall and the first surround wall portion is minimizing or eliminating, thereby improving the aesthetic appearance and/or preventing any contents in the storage bin compartment from falling behind the bin and getting trapped between the bin wall and the surround wall or other understructure.

In an additional advantage of the storage bin assembly disclosed herein is that, in some embodiments, the flap arrangement is configured to slidingly interface with the first surround wall portion such that the first outer edge portion of the flap section contacts the first surround wall portion during movement of the bin between the closed position and the open position. This helps reduce any gap between the bin wall and the first surround wall portion.

An additional advantage of the storage bin assembly disclosed herein is that, in some embodiments, the flap section is pivotally coupled to the bin wall. By pivotably coupling the flap section to the bin wall, the flap arrangement may be installed with the bin for efficient installation into the stowage space of the surround during production assembly.

In an additional advantage of the storage bin assembly disclosed herein is that, in some embodiments, the storage bin arrangement further includes a hinge that pivotally couples the flap section to the bin wall. For example, the hinge may be a molded-in hinge that is integrally formed with the bin wall and the flap arrangement includes one or more attachment features that extend from the flap section and pivotably coupled to the molded-in hinge. In another example, the flap arrangement further comprises a base section that is fixedly coupled to the bin, and the hinge is a living hinge integrally formed with and disposed between the flap section and the base section. Such hinges are relatively simple to implement in designed and production, thereby facilitating low cost and/or efficiency in design and manufacture. Further, such hinges allow the flap arrangement to be installed with the bin for efficient installation into the stowage space of the surround during production assembly.

An additional advantage of the storage bin assembly disclosed herein is that, in some embodiments, the storage bin arrangement further includes a glove box door that is fixedly coupled to the bin to move with the bin between the closed position and the open position. Thus, the improvements of minimizing or eliminating any gaps between the bin and surround walls can be implemented of a glove box assembly.

Figure 2:
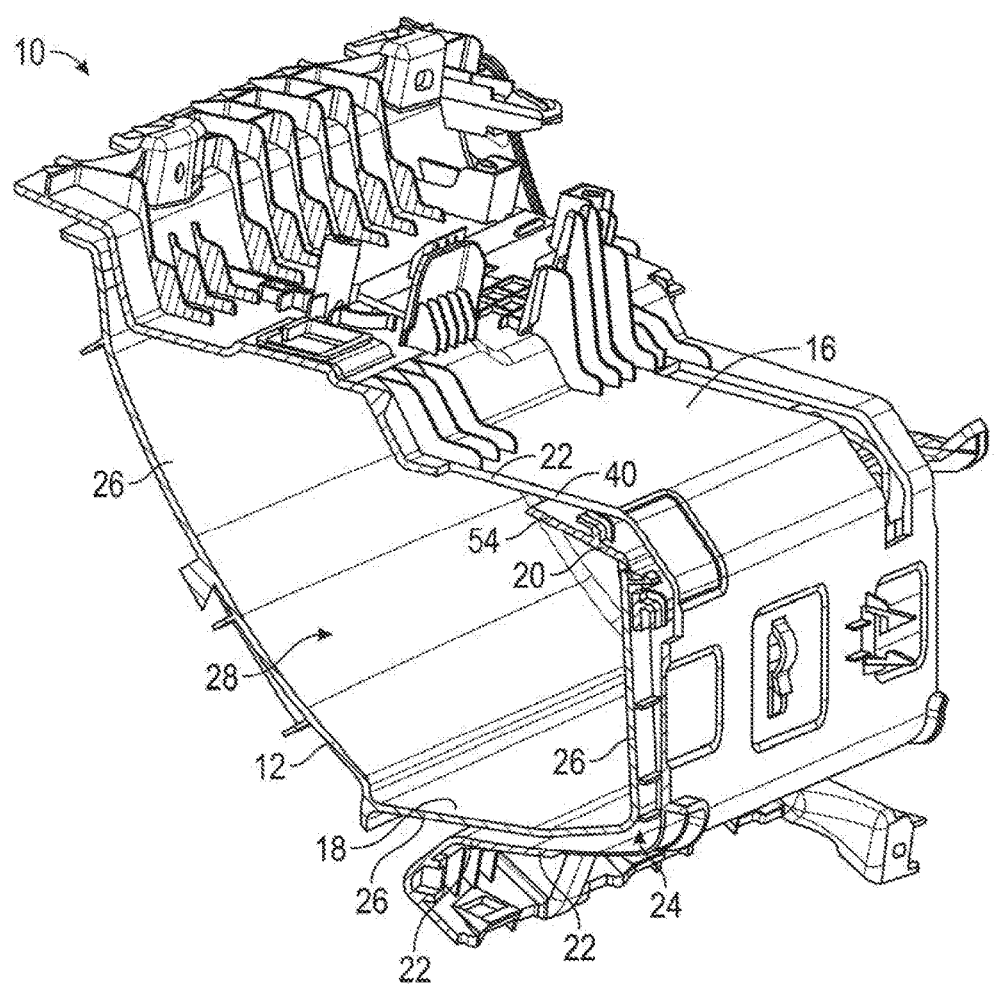
FIG. 2 is a perspective sectional view of a storage bin arrangement in a closed position in accordance with an exemplary embodiment.
Figure 3:
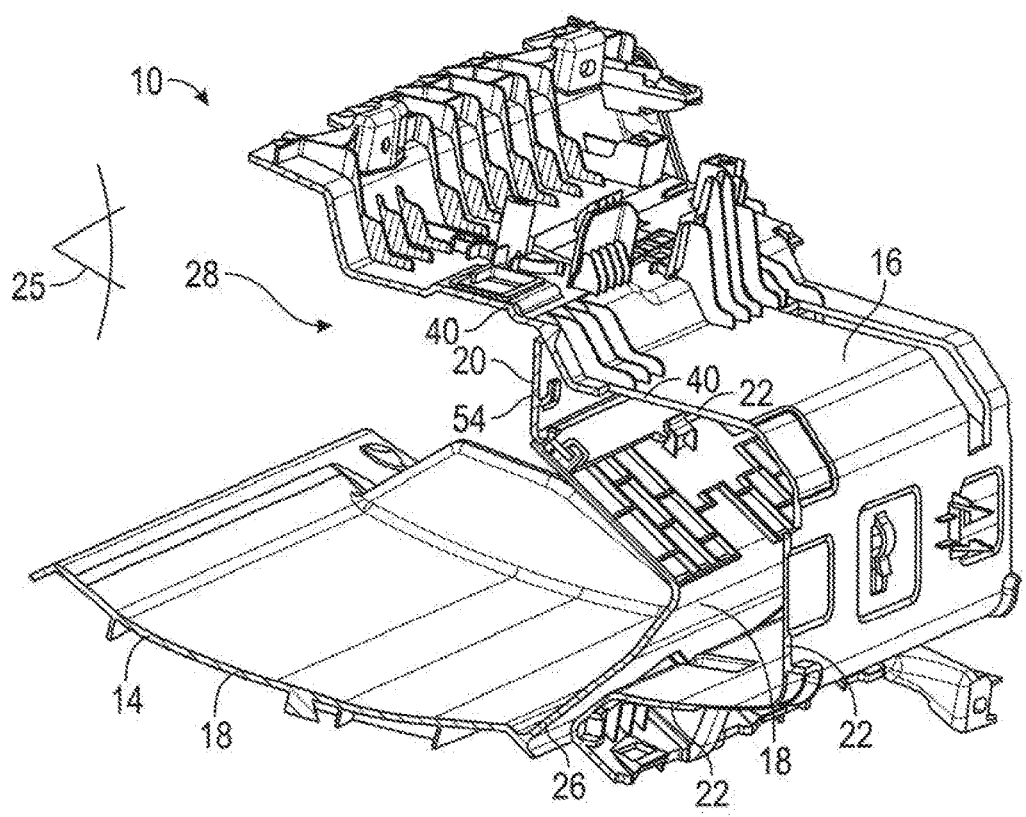
FIG. 3 is a perspective sectional view of a storage bin arrangement in an open position in accordance with an exemplary embodiment.
Figure 4:
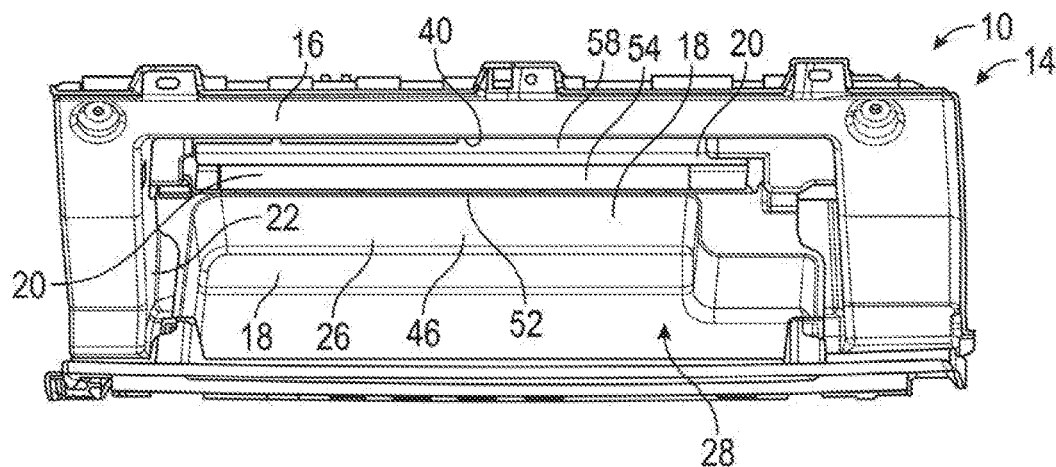
FIG. 4 is a rear view of a storage bin arrangement in an open position in accordance with an exemplary embodiment.

FIG. 1 is a sectional view of a storage bin arrangement 10 for a motor vehicle in a closed position 12 and an open position 14 in accordance with an exemplary embodiment. FIGS. 2 and 3 are perspective sectional views of the storage bin arrangement 10 in the closed position 12 and the open position 14, respectively. FIG. 4 is a rear view of the storage bin arrangement 10 in an open position 14. Referring to FIGS. 1-4, the storage bin arrangement 10 includes a surround 16, a bin 18, and a flap arrangement 20. The surround 16 may be, for example, a substrate for a vehicle interior component or assembly such as a portion of or a substrate or other structure of an instrument panel or the like. The surround 10 has a surround wall 22 that at least partially defines a stowage space 24.

The bin 18 has a bin wall 26 that at least partially defines a bin storage compartment 28. The bin 18 is configured to move in the stowage space 24 between the closed position 12 and the open position 14. In an exemplary embodiment, the bin 18 is pivotably coupled to the surround 16 (or another adjacent fixed structure) at 30 such that the bin 18 can rotate in a radial direction (indicated by single headed arrow 32) from the closed position 12 to the open position 14. As illustrated in FIGS. 1-2, in the closed position 12, the bin storage compartment 28 is disposed or substantially disposed in the stowage space 24 and is generally not exposed, for example, to a vehicle occupant 25. As illustrated in FIGS. 1 and 3-4, as the bin 18 rotates or otherwise moves to the open position 14, the bin 18 moves at least partially out of the stowage space 24 and the bin storage compartment 28 becomes exposed or substantially exposed, for example, to the vehicle occupant 25.

In an exemplary embodiment, the storage bin arrangement 10 further includes a glove box door 34 that is attached or otherwise fixedly coupled to the bin 18. The storage bin arrangement 10 may be configured as part of a glove box-bin assembly in which the bin 18 and the glove box door 34 move together between the closed position 12 and the open position 14. In particular, the glove box door 34 opens or rotates in the radial direction 32 generally in a vehicle rearward direction (indicated by single headed arrow 36) to the open position 14. Likewise, the glove box door 34 closes or rotates back (opposite the radial direction 32) generally in a vehicle forward direction (indicated by single headed arrow 38) to the closed position 12.

As illustrated, the surround 16 includes the surround wall 22 that includes surround wall portions 40, 42, and 44. The surround wall portions 40 and 44 are spaced apart from each other and the surround wall portion 42 extends between and is coupled to the surround wall portions 40 and 44. In particular, the surround wall portion 42 is in a relatively vehicle forward position extending transverse to the vehicle forward direction 38 and the surround wall portions 40 and 44 extend generally away from the surround wall portion 42 in the vehicle rearward direction 36 to define the stowage space 24.

The bin 18 includes the bin wall 26 that includes the bin wall portions 46, 48, and 50. The bin wall portions 46 and 50 are spaced apart from each other and the bin wall portion 48 extends between and is coupled to the lower edge portions of the bin wall portions 46 and 50 to define the bin storage compartment 28.

As illustrated, in the closed position 12, the bin wall portion 46 is adjacent to the surround wall 42 and the bin wall portion 48 is adjacent to the surround wall portion 44 while the bin wall portion 50 is in a relatively vehicle rearward position extending transverse to the vehicle rearward direction 36. Notably, a gap 56 (indicated by double headed arrow 56a) is present between an upper edge portion 52 of the bin wall portion 46 and the surround wall portion 40. When the bin 18 is rotated to the open position 14, the bin wall portion 46 rotates away from the surround wall 42 in the radial direction 32 so as to move generally in the vehicle rearward direction 36 with the other bin wall portions 48 and 50 correspondingly moving. During movement of the bin 18 to the open position 14, the gap 56 (now indicated by double headed arrow 56b) between the upper edge portion 52 of the bin wall portion 46 and the surround wall portion 40 increases in distance. The increase in the gap 56 during movement of the bin to the open position 14 is due in part to the rotational movement about the pivot axis 30 in the radial direction 32, and further and as illustrated, the surround wall portion 40 being configured to flare outwardly in the vehicle rearward direction 36 and including a step 60.

In an exemplary embodiment, the flap arrangement 20 is disposed adjacent to the upper edge portion 52 of the bin wall portion 46. The flap arrangement 20 includes a flap section 54 that extends between the bin 18 and the surround wall 22 and is configured to move the flap section 54 relative to the bin 18 during movement of the bin 18 between the closed position 12 and the open position 14 so as to substantially cover or hide the gap 56, for example, from the vehicle occupant 25.

In an exemplary embodiment, the flap section 54 is pivotably coupled to the bin wall portion 46. As illustrated, when the bin 18 is moved or rotated in the radial direction 32 to the open position 14, the flap section 54 rotates about or proximate the upper edge portion 52 of the bin wall portion 46 in a direction (indicated by single headed arrow 62) substantially opposite the radial direction 32. That is, as the bin 18 moves generally in the vehicle rearward direction 36, the flap section 54 rotates relative to the bin wall portion 46 generally in the vehicle forward direction 54 so as to be repositioned to substantially cover or hide the gap 56 (e.g., gap 56b) from the vehicle occupant 25.

Referring to FIGS. 1 and 4, the flap section 54 has an outer edge portion 58 spaced apart from the upper edge portion 52 of the bin wall portion 46. In an exemplary embodiment, the outer edge portion 58 of the flap section 54 slidingly interfaces with the surround wall portion 40 such that the outer edge portion 58 is disposed immediately adjacent to and/or contacts the surround wall portion 40 during movement of the bin between the closed position 12 and the open position 14. As such, the flap section 54 rotates about the upper edge portion 52 of the bin wall portion 46 in the radial direction 62 such that the flap section 54 substantially covers and/or hides the gap 56 as the bin 18 is advanced towards and reaches the fully open position 14.

Referring to FIGS. 1, 5, and 9-10, in an exemplary embodiment, the storage bin arrangement 10 includes a hinge 64 that pivotally couples the flap section 54 to the bin wall portion 46. As illustrated, the hinge 64 includes a hinge body 66, which may be configured as a hinge body sleeve and/or hinge receiving feature that receives or holds a pin 68, or alternatively, the hinge body 66 and the pin 68 may be integrally formed together. For example, the hinge 64 including the hinge body 66 and the pin 68 may be a molded-in hinge that is integrally formed with the bin wall portion 46 proximate the upper edge portion 52.

Alternatively, the hinge 64 may be a separate component that is attached to the bin wall portion 46. For example, when the hinge 64 is added as a separate component, the hinge 64 including the pin 68 (or other rotational axis or the like) and optionally the hinge body 66 or other hinge structure may be attached directly or indirectly to the bin wall portion 46, for example, by using fasteners, snap fit features, or the like.

One or more hinge attachment features 70 (see FIG. 10) may be coupled to or integrally formed with the flap section 54. The hinge attachment features 70 extend from the lower portion of the flap section 54 and are pivotally coupled to a portion of the hinge 64, such as the pin 68 or the like. As such, the flap section 54 including the hinge attachment features 70 can rotate about the pin 68 of the hinge 64 in the radial direction 62 when the bin 18 moves from the closed position 12 to the open position 14 so that the outer edge portion 58 of the flap section 54 moves and/or slides against the surround wall portion 40.

Figure 7:
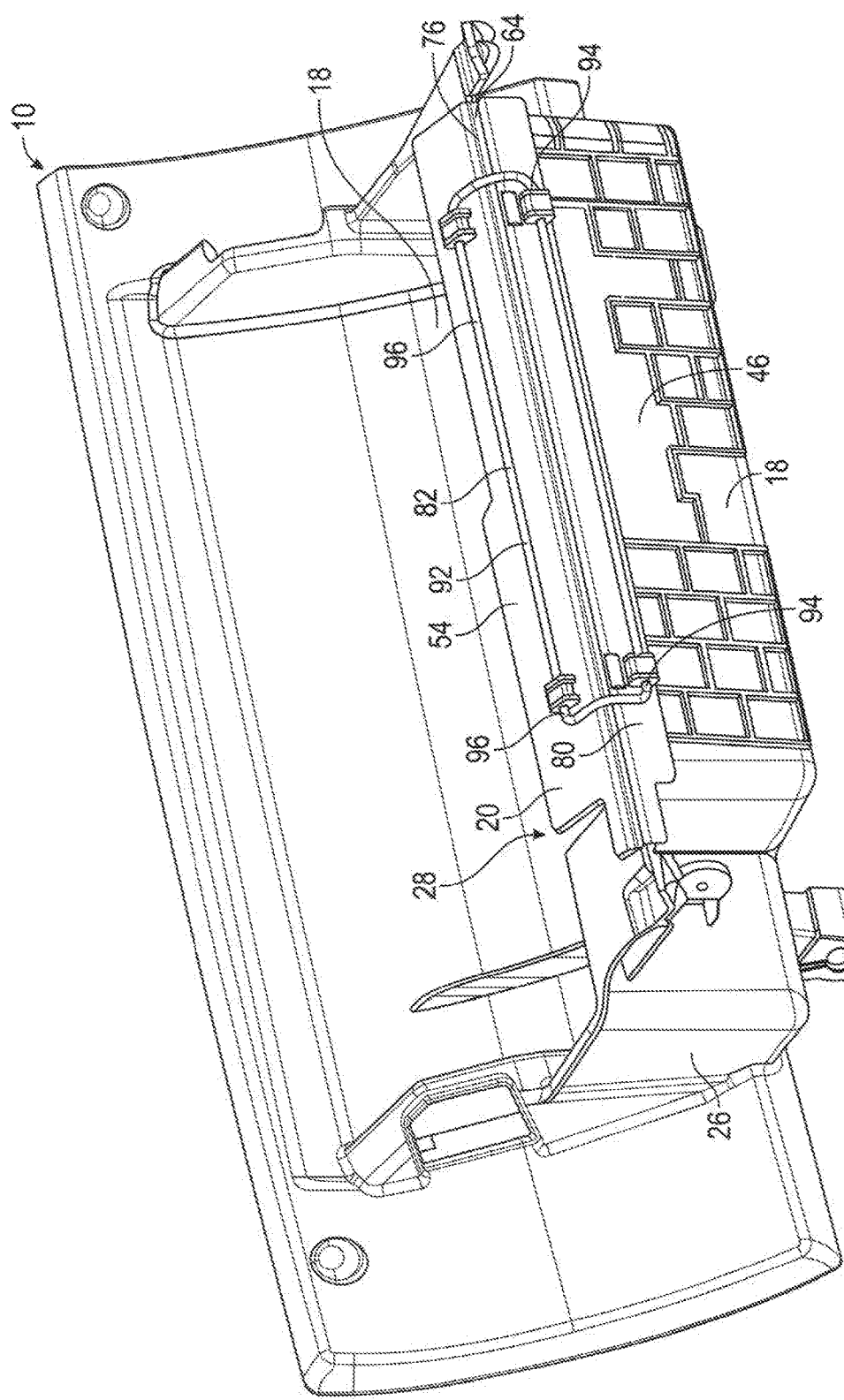
FIG. 7 is a perspective view of a storage bin arrangement in accordance with an exemplary embodiment.
Figure 8:
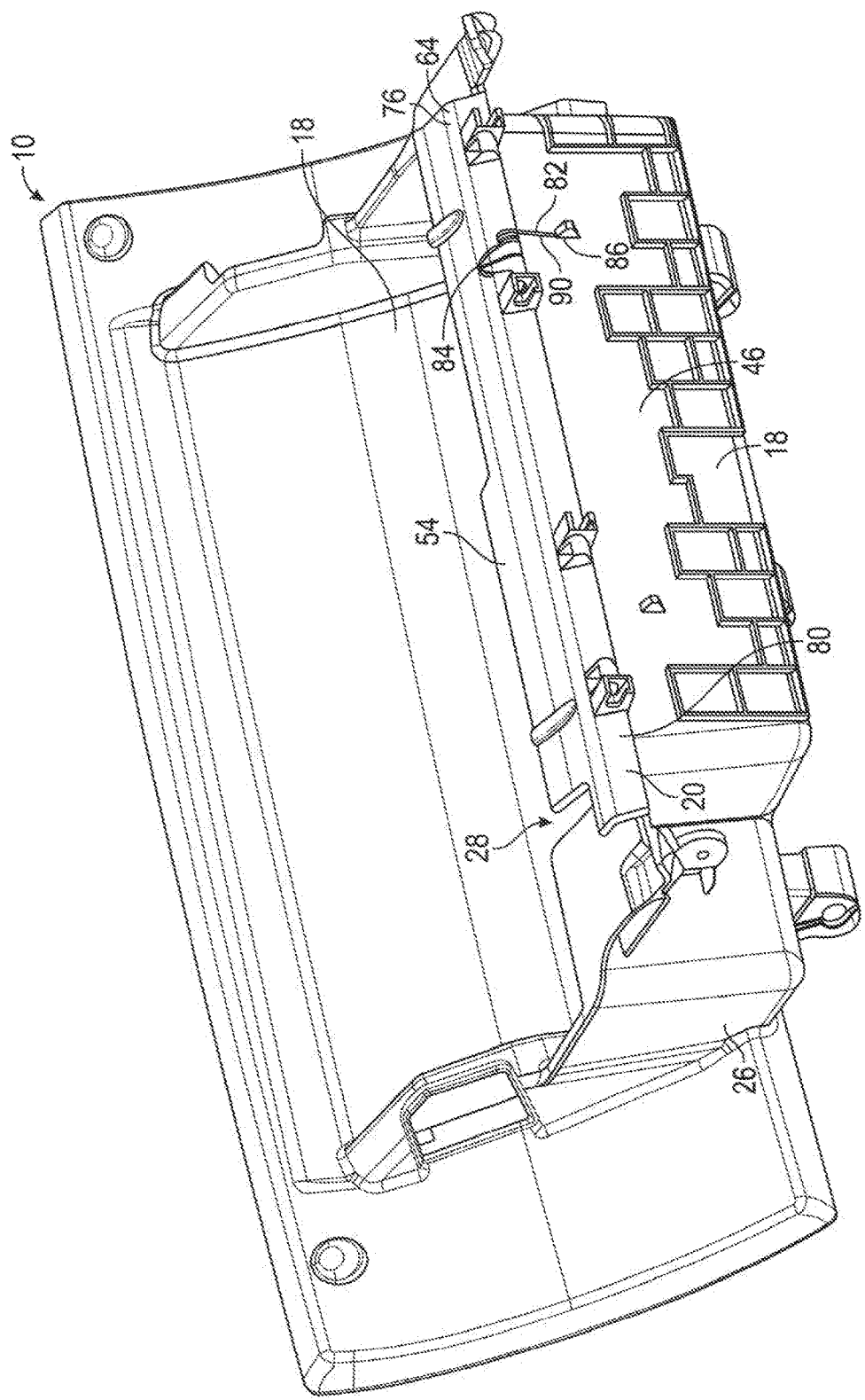
FIG. 8 is a perspective view of a storage bin arrangement in accordance with an exemplary embodiment.
Figure 9:
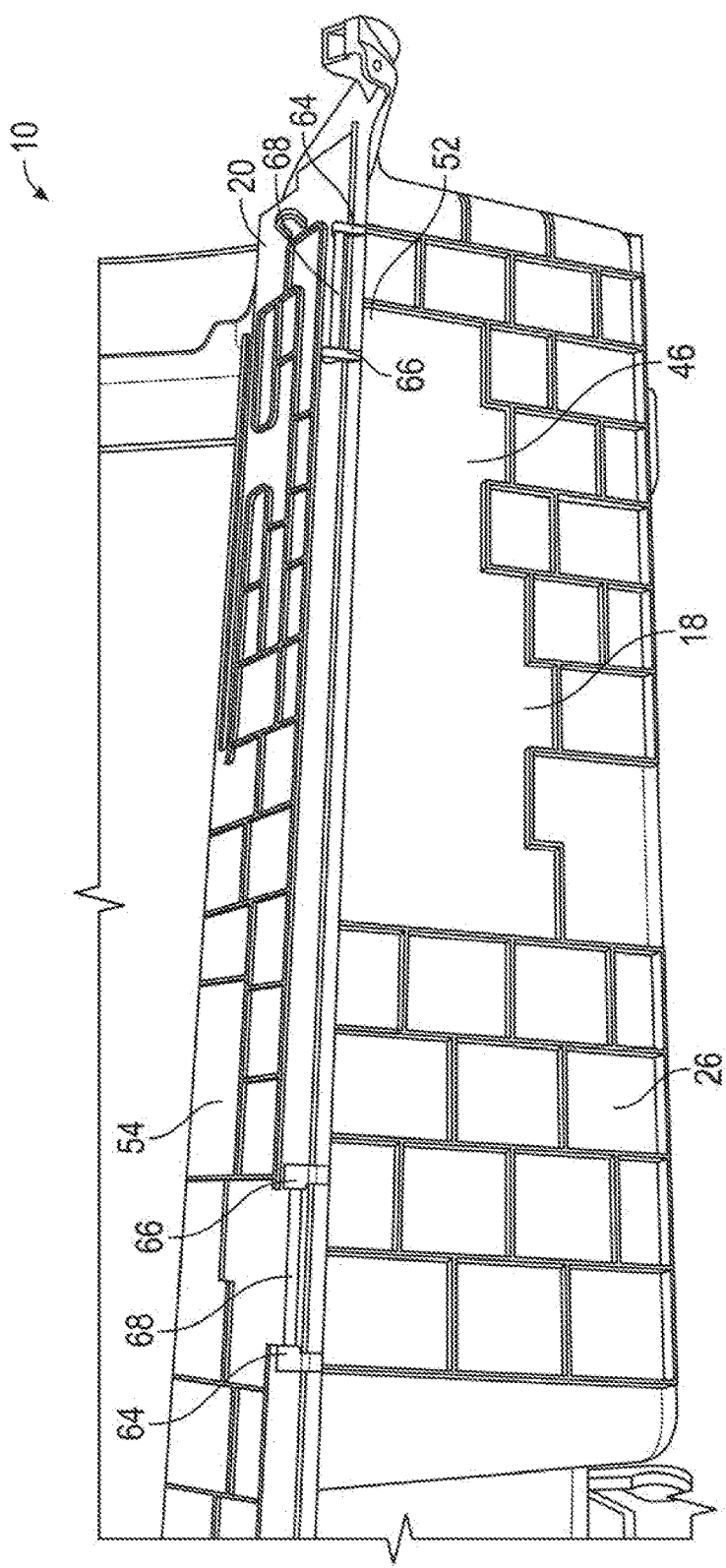
FIG. 9 is a perspective view of a storage bin arrangement in accordance with an exemplary embodiment.
Figure 10:
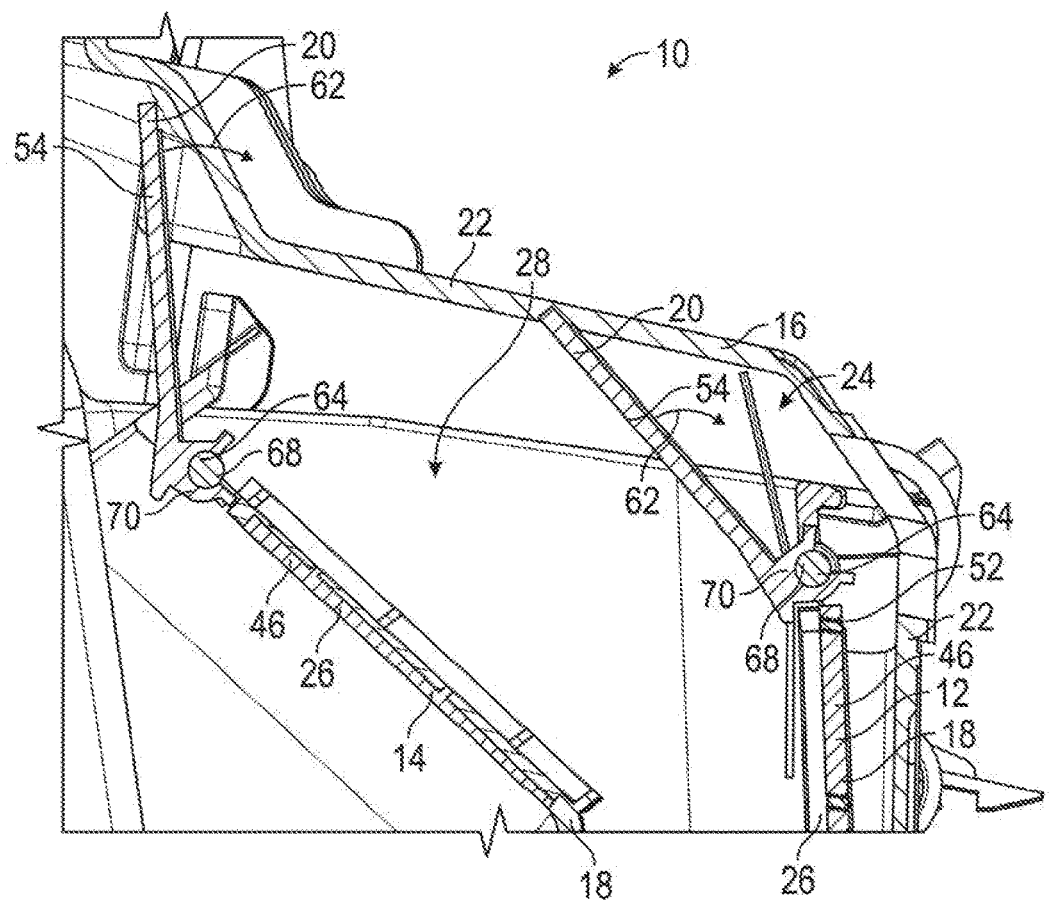
FIG. 10 is a sectional view of a storage bin arrangement in accordance with an exemplary embodiment.

In an alternative embodiment and with reference to FIGS. 1 and 7-8, the hinge 64 may be configured as a living hinge 76 that is integrally formed with the flap section 54. As illustrated, the flap arrangement 20 includes a base section 80 that is fixedly coupled to the bin wall section 46 via fasteners, snap fit features, welding, or the like. The living hinge 76 is integrally formed with and disposed between the flap section 54 and the base section 80, for example, by a forming or molding process such as injection molding or the like. As such, the flap section 54 can rotate about the living hinge 76 in the radial direction 62 when the bin 18 moves from the closed position 12 to the open position 14 so that the outer edge portion 58 of the flap section 54 move and slide against the surround wall portion 40 as discussed above.

Figure 11:
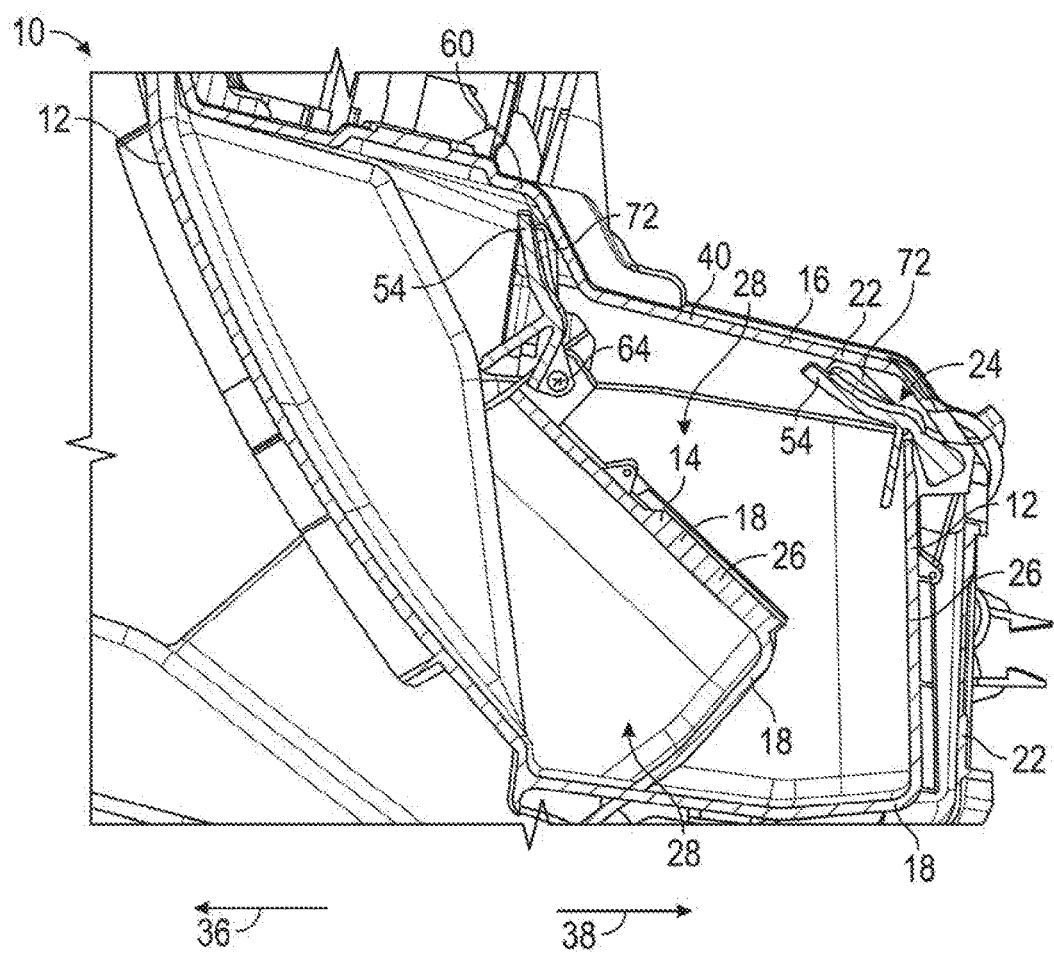
FIG. 11 is a sectional view of a storage bin arrangement in accordance with an exemplary embodiment.

Referring to FIGS. 1 and 11, in an exemplary embodiment, the vehicle forward facing surface of the flap section 54 may include a plurality of positive features 72 (e.g., ribs or the like) that extend towards the surround wall portion 40. The positive features 72 facilitate the flap section 54 sliding in the generally vehicle rearward direction 36 along the interior surface of the surround wall portion 40 including the step 60 when the bin 18 is moved to the open position 14. Moreover, the positive features 72 may help the flap section 54 remain in contact with the surround wall portion 40 during movement.

Figure 12:
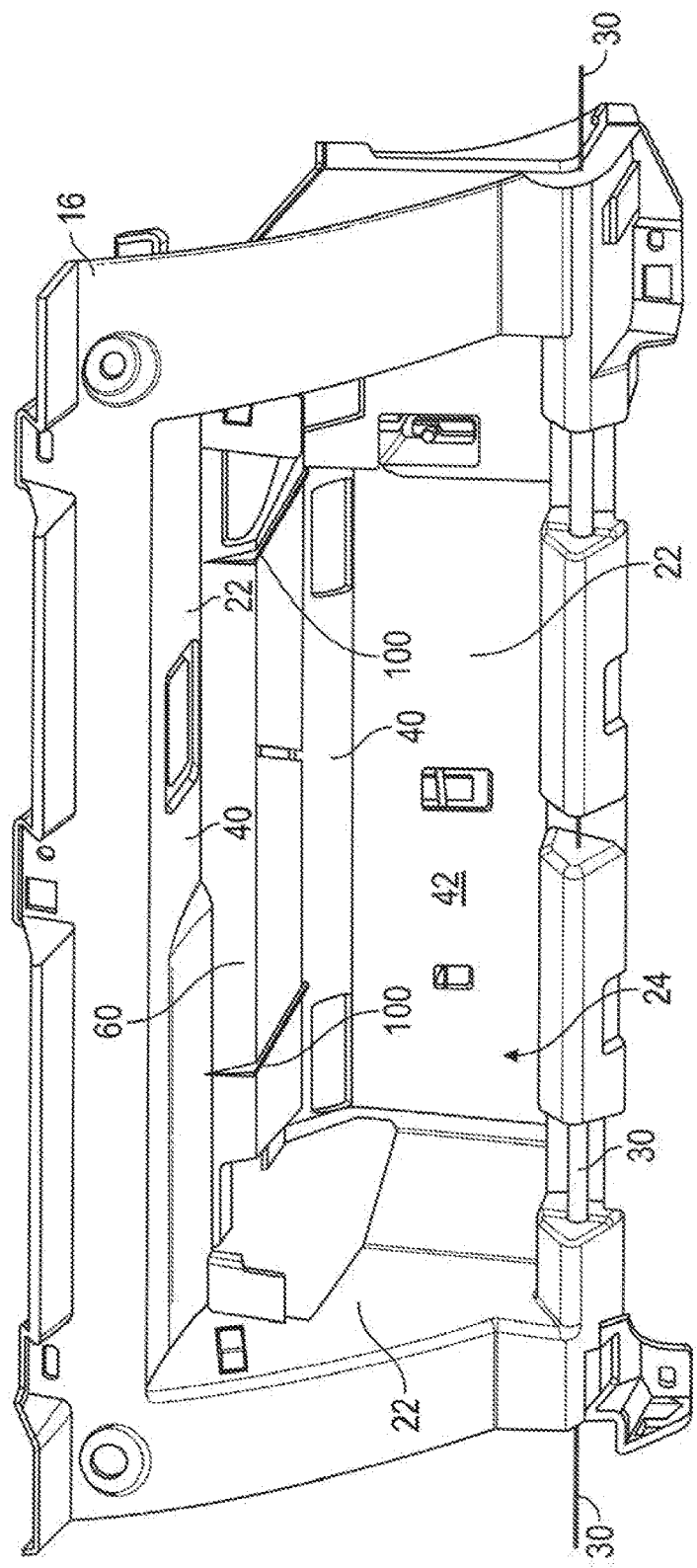
FIG. 12 is a perspective view of a surround in accordance with an exemplary embodiment.

Referring to FIGS. 1 and 12, in an exemplary embodiment, the surround wall portion 40 includes one or more guiding ribs 100 to help smoothly guide the flap section 54 along the surround wall portion 40 during movement of the bin 18. In one example, the outer edge portion 58 of the flap section 54 slidingly interfaces and/or contacts the guiding ribs 100 in the generally vehicle rearward direction 36 when the bin 18 is moved from the closed position 12 towards the open position 14 while remaining slightly spaced apart from other portions of the surround wall portion 40 that are adjacent to the guiding ribs 100.

Figure 5:
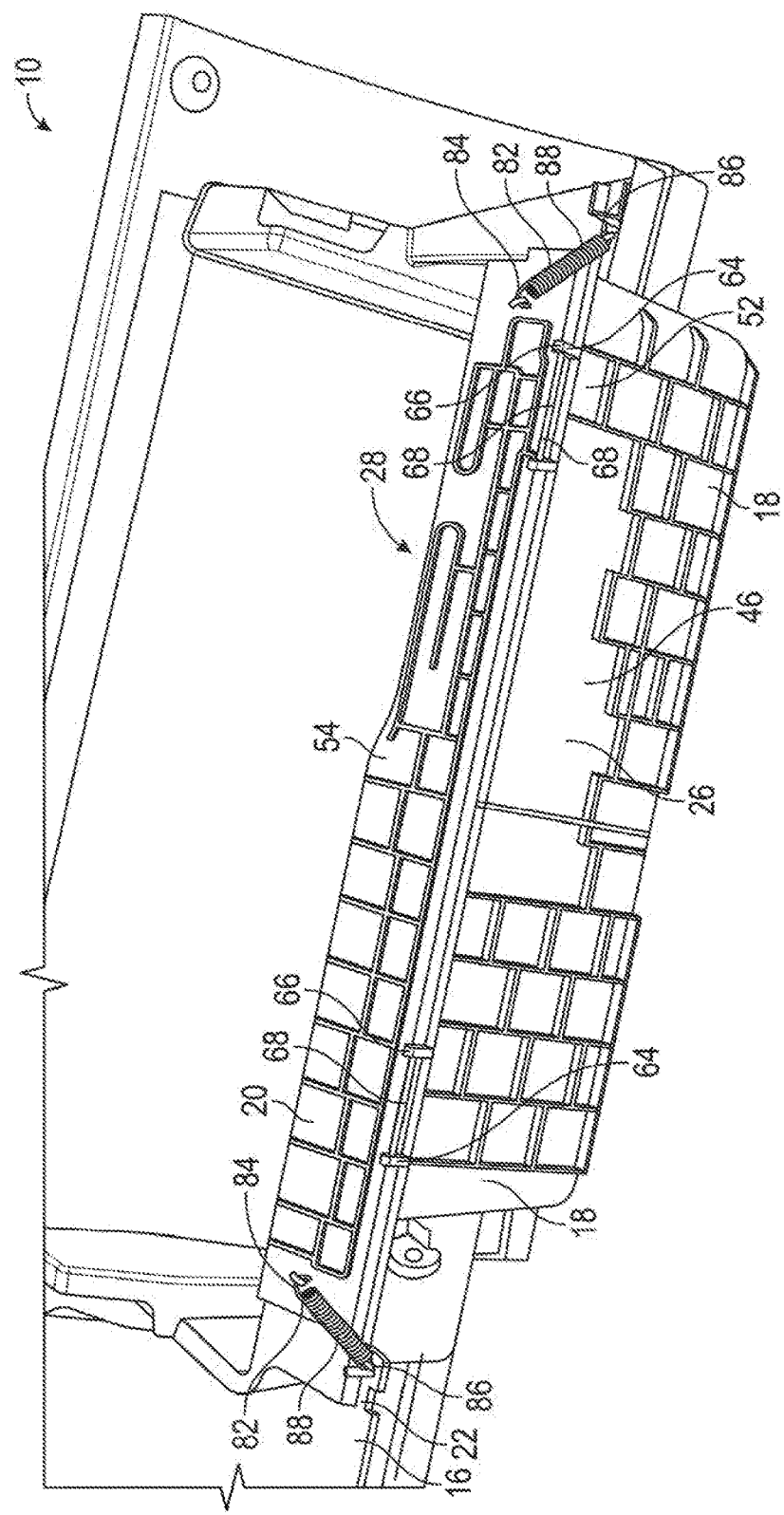
FIG. 5 is a perspective view of a storage bin arrangement in accordance with an exemplary embodiment.
Figure 6:
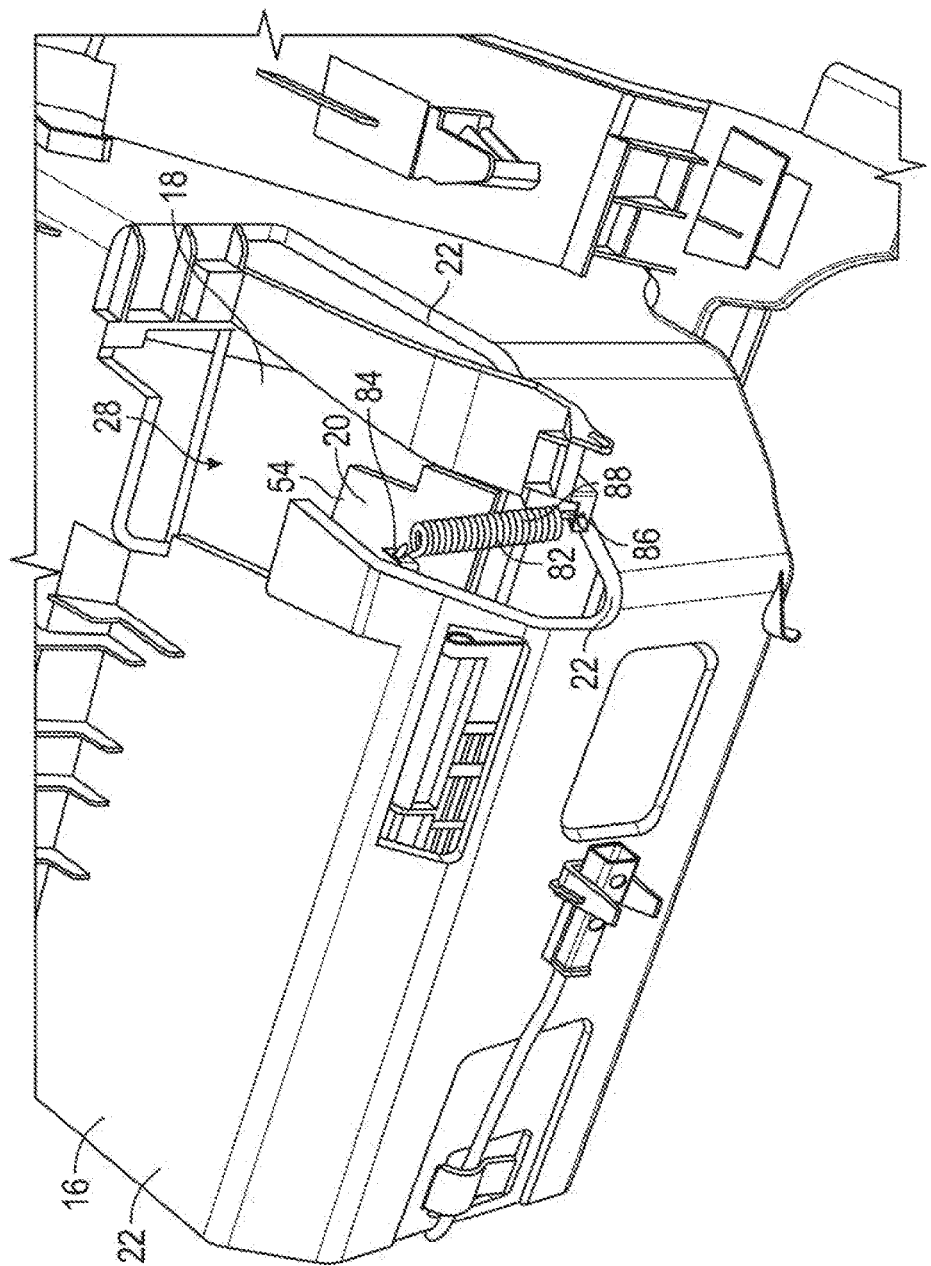
FIG. 6 is a perspective view of a storage bin arrangement in accordance with an exemplary embodiment.

Referring to FIGS. 1 and 5-6, in an exemplary embodiment, the flap arrangement 20 includes a biasing member(s) 82 that is operatively coupled to the flap section 54 to bias the flap section 54 towards the surround wall portion 40. During movement of the bin 18 from the closed position 12 to the open position 14, the biasing member 82 moves the flap section 54 such that the outer edge portion 58 of the flap section 54 slidingly interfaces and/or remains in contact with the surround wall portion 40. As illustrated, the biasing member 82 has end portions 84 and 86. The end portion 84 of the biasing member 82 is operatively coupled to the flap section 54 to bias the flap section 54 towards the surround wall portion 40 during movement of the bin 18. As illustrated, the end portion 86 of the biasing member is coupled to the surround 16 (e.g., surround wall 22) either directly or via an attachment feature, bracket, or the like.

In an exemplary embodiment, the biasing member 82 is a traction or tension spring 88 (e.g., coil spring or the like in tension). In this example, the end portion 86 of the traction or tension spring 88 is positioned in a relatively more vehicle forward position (e.g., coupled to a vehicle forward portion of the surround wall 22) than the end portion 84 of the biasing member 82 that is attached or otherwise operatively coupled to the flap section 54. During movement of the bin 18 from the closed position 12 to the open position 14, the traction or tension spring 88 is in tension and pulls the end portion 84 that is coupled to the flap section 54 generally in the vehicle forward direction 38 towards the end portion 86 to move or otherwise bias the outer edge portion 58 of the flap section 54 towards the surround wall portion 40.

Alternative embodiments for the biasing member(s) 82 may be used. In one example and with reference also to FIG. 8, the biasing member 82 is a torsion spring, leaf spring, or clip spring 90 (e.g., spring configured for applying a rotational or bending moment). In this example, the end portion 86 of the spring 90 is coupled, for example, to the bin 18, e.g., the bin wall portion 46 which is positioned in a relatively more vehicle forward and lower position than the end portion 84. During movement of the bin 18 from the closed position 12 to the open position 14, the torsion spring, leaf spring, or clip spring 90 applies a rotational or bending moment to the flap section 54 to bias and/or rotate the flap section 54 in the radial direction 62 such that the outer edge portion 58 of the flap section 54 is biased towards the surround wall portion 40.

In another example and with reference also to FIG. 7, the biasing member 82 is an elastomeric member 92 (e.g., rubber sting or band in tension). In this example, a portion 94 of the elastomeric member 92 is coupled, for example, to the base section 80 of the flap arrangement 20 while a portion 96 of the elastic member 92 is coupled to the flap section 54. As illustrated, the portion 94 of the elastic member 92 is positioned in a relatively more vehicle forward and lower position than the portion 96. During movement of the bin 18 from the closed position 12 to the open position 14, the elastic member 92 pulls the flap section 54 to bias and/or rotate the flap section 54 in the radial direction 62 such that the outer edge portion 58 of the flap section 54 is biased towards the surround wall portion 40.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A storage bin arrangement for a motor vehicle comprising:
   a surround having a surround wall that at least partially defines a stowage space;
   a bin having a bin wall that at least partially defines a bin storage compartment and is configured to move in the stowage space between a closed position and an open position, wherein in the closed position, the bin storage compartment is substantially disposed in the stowage space and in the open position, the bin storage compartment is substantially exposed; and
   a flap arrangement comprising a flap section extending between the bin and the surround wall, wherein the flap arrangement is configured to move the flap section relative to the bin during movement of the bin between the closed position and the open position, wherein the flap arrangement further comprises a biasing member having a first portion that is operatively coupled to the flap section to bias the flap section towards the surround wall during movement of the bin between the closed position and the open position, and the biasing member has a second portion coupled to the surround.

2. The storage bin arrangement of claim 1, wherein the biasing member is a traction or tension spring having the first portion operably coupled to the flap section.

3. The storage bin arrangement of claim 1, wherein the biasing member is a torsion spring, leaf spring, or clip spring that has the first portion operatively coupled to the flap section.

4. The storage bin arrangement of claim 1, wherein the biasing member is an elastomeric member having the first portion operatively coupled to the flap section.

5. The storage bin arrangement of claim 1, wherein the surround wall has a first surround wall portion and a second surround wall portion that are spaced apart from each other and a third surround wall portion that extends between and is coupled to the first and second surround wall portions, wherein the first and second surround wall portions extend in corresponding directions generally away from the third surround wall portion to define the stowage space, and wherein the flap section has a first outer edge portion spaced apart from the bin wall and the biasing member is operatively coupled to the flap section to bias the first outer edge portion of the flap section towards the first surround wall portion.

6. The storage bin arrangement of claim 1, wherein the flap section is pivotally coupled to the bin wall.

7. The storage bin arrangement of claim 6, further comprising a hinge that pivotally couples the flap section to the bin wall.

8. The storage bin arrangement of claim 7, wherein the hinge is a molded-in hinge that is integrally formed with the bin wall and the flap arrangement includes one or more attachment features that extend from the flap section and pivotably coupled to the molded-in hinge.

9. The storage bin arrangement of claim 7, wherein the flap arrangement further comprises a base section that is fixedly coupled to the bin, and wherein the hinge is a living hinge integrally formed with and disposed between the flap section and the base section.

10. The storage bin arrangement of claim 1, further comprising a glove box door that is fixedly coupled to the bin to move with the bin between the closed position and the open position.

11. A storage bin arrangement for a motor vehicle comprising:
    a surround having a surround wall that at least partially defines a stowage space;
    a bin having a bin wall that at least partially defines a bin storage compartment and is configured to move in the stowage space between a closed position and an open position, wherein in the closed position, the bin storage compartment is substantially disposed in the stowage space and in the open position, the bin storage compartment is substantially exposed; and
    a flap arrangement comprising a flap section extending between the bin and the surround wall, wherein the flap arrangement is configured to move the flap section relative to the bin during movement of the bin between the closed position and the open position, wherein the flap arrangement further comprises a biasing member having a first portion that is operatively coupled to the flap section to bias the flap section towards the surround wall during movement of the bin between the closed position and the open position, wherein the surround wall has a first surround wall portion and a second surround wall portion that are spaced apart from each other and a third surround wall portion that extends between and is coupled to the first and second surround wall portions, wherein the first and second surround wall portions extend in corresponding directions generally away from the third surround wall portion to define the stowage space, and wherein the flap section has a first outer edge portion spaced apart from the bin wall and the biasing member is operatively coupled to the flap section to bias the first outer edge portion of the flap section towards the first surround wall portion, wherein the flap arrangement is configured to slidingly interface with the first surround wall portion such that the first outer edge portion of the flap section contacts the first surround wall portion during movement of the bin between the closed position and the open position.

12. The storage bin arrangement of claim 11, wherein the biasing member has a second portion coupled to the surround.

13. The storage bin arrangement of claim 11, wherein the biasing member has a second portion that is coupled to the bin.

14. The storage bin arrangement of claim 11, wherein the flap arrangement further comprises a base section that is fixedly coupled to the bin, and wherein the flap section is pivotably coupled to the base section and the biasing member has a second portion that is coupled to the base section.

* * * * *